United States Patent
Lee

(10) Patent No.: US 7,020,454 B2
(45) Date of Patent: Mar. 28, 2006

(54) METHOD FOR MAKING COMMUNICATION IN WIRELESS LOCAL LOOP SYSTEM

(75) Inventor: Jang Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 400 days.

(21) Appl. No.: 10/140,813

(22) Filed: May 9, 2002

(65) Prior Publication Data

US 2002/0193148 A1    Dec. 19, 2002

(30) Foreign Application Priority Data

Jun. 14, 2001   (KR) .............................. P2001-33500

(51) Int. Cl.
*H04M 11/00*    (2006.01)
*H04Q 7/20*    (2006.01)

(52) U.S. Cl. ................. 455/404.1; 455/426.2

(58) Field of Classification Search ............ 455/426.2, 455/554.1, 554.2, 404.1, 565, 564; 379/200, 379/352
See application file for complete search history.

(56) References Cited

U.S. PATENT DOCUMENTS

| | | | |
|---|---|---|---|
| 5,884,193 A * | 3/1999 | Kaplan ..................... | 455/565 |
| 6,259,905 B1 * | 7/2001 | Berkowitz et al. ........... | 455/401 |
| 6,510,315 B1 * | 1/2003 | Arnson .................... | 455/404.1 |
| 6,654,598 B1 * | 11/2003 | Son ......................... | 455/401 |
| 2001/0041564 A1 * | 11/2001 | Kim ......................... | 455/422 |

FOREIGN PATENT DOCUMENTS

| | | |
|---|---|---|
| JP | 2000-188635 | 7/2000 |
| JP | 2001-069552 | 3/2001 |
| JP | 2001-128243 | 5/2001 |
| JP | 2001-508255 | 6/2001 |
| JP | 2002-514869 | 5/2002 |
| KR | 1001856130000 | 12/1998 |
| KR | 1020000012887 | 3/2000 |
| WO | WO 98/31180 | 7/1998 |
| WO | WO 99/57921 | 11/1999 |

OTHER PUBLICATIONS

Japanese Office Action dated May 6, 2005.

* cited by examiner

*Primary Examiner*—Nguyen T. Vo
(74) *Attorney, Agent, or Firm*—Fleshner & Kim, LLP

(57) ABSTRACT

A method for making communication in a wireless local loop system is disclosed, including storing at least one digits provided by a user and carrying out a service required by the stored digits, when a WLL (Wireless Local Loop) subscriber terminal is off-hooked and transmitting any one of the stored digit or information corresponding to the stored digit to a system after a prescribed time period has passed from a time a last digit is provided. A load on a base station can thus be reduced by using the terminal to analyze digits provided by a subscriber to support services set by the subscriber.

43 Claims, 3 Drawing Sheets

METHOD FOR MAKING COMMUNICATION IN WIRELESS LOCAL LOOP SYSTEM

BACKGROUND OF THE INVENTION

1. Field of the Invention

The present invention relates to a communication system, and more particularly, to a wireless local loop system.

2. Background of the Related Art

A wireless local loop system (WLL) provides wireless subscriber lines between subscribers and a switching center. The WLL system can provide voice communication services, facsimile services, and data communication services.

FIG. 1 illustrates a related art separate type and integrated type WLL system. Referring to FIG. 1, the WLL system is provided with a stationary telephone set 10 installed in a home or office, a WLL wireless access device 20 connected to the stationary telephone set 10 for transmitting and receiving information over a wireless interface, and an integrated type WLL terminal 30 having a WLL wireless access device built therein. The WLL system further includes base stations 40 for accessing the WLL wireless access device 20 or the integrated type WLL terminal 30, a base station controller 50 connected to the base station by wire for processing a call and transmitting a message, and a managing device 60 for managing and maintaining the WLL system. Finally, a switching center 70 is connected to the base station controller 50.

An operation of various parts of the foregoing WLL system will next be described.

The WLL wireless access device 20, provided at an end point of the WLL system, transmits and receives information over a wireless interface. The wireless access device further transmits a signal converted from a radio frequency signal into a base band signal to a subscriber, and transmits a signal converted from a base band signal into a radio frequency signal to a base station 40. The wireless access device also processes a protocol signal for a communication network, and processes a voice signal.

The base station 40 accesses the WLL wireless access device 20 by a wireless WLL terminal, or an integrated type WLL terminal 30 having the WLL wireless access device 20 built therein. The base station 40 also processes a radio frequency signal, to modulate or demodulate the radio frequency signal. The base station 40 further performs channel encoding and decoding on the modulated or demodulated signal. The base station 40 accesses the base station controller 50 through a particular trunk E1/HDSL by wire.

The base station controller 50 is positioned between the base station 40 and the switching center 70, and controls a number of base stations 40. The base station controller 50 transmits a signal, processes a call, transforms a code, and interfaces with the base station 40 and the switching center 70.

The managing device 60 manages and maintains the WLL wireless access device 20, the base stations 40, and the base station controller 50. This is performed using a function for managing a network system, a function for managing network elements, a function for managing performance, a function for processing a data, a function for managing by software, and a function for managing security.

In the foregoing WLL system, when the WLL terminal 30 is off-hook, an origination message is at once provided from the WLL terminal 30 to the base station 40, to initially assign a communication channel (or traffic channel) for the terminal 30 by the base station 40. If a digit(s) is dialed, the digit(s) is temporarily stored, and then transmitted to the base station 40 after the traffic channel is assigned. Each of the digits provided after the traffic channel is assigned is sequentially transmitted to the base station 40 whenever the digit is provided.

The base station 40 receives a dual tone multiple frequency (DTMF) message inclusive of the provided digit information from the terminal 30, analyzes a telephone number based on the DTMF message, and connects a destination terminal and an origination terminal 30.

The related art WLL system has various problems. For example, the processing of all of the digits from the subscriber at the base station 40 causes an overload on the base station 40.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for performing communication in a wireless local loop system that reduces an overload of a base station by support from terminal.

To achieve at least the above objects in whole or in parts, there is provided a method for making communication in a wireless local loop system, including (a) storing at least one digit provided by a user and carrying out a service required by the stored digits, when an origination WLL (Wireless Local Loop) terminal is off-hook and (b) transmitting one of the stored digit or information corresponding to the stored digit to the system after a certain time period is passed from a time a last digit is provided.

Preferably, the origination WLL terminal has a wireless access device at outside or inside thereof.

Preferably, the method for making communication in a wireless local loop system further includes the step of establishing a call between the origination WLL terminal and the system, after the origination WLL terminal is off-hooked.

Preferably, the step (a) includes the step of carrying out a service of connecting to a destination WLL terminal required by a provided digit if at least one particular digit is provided.

Preferably, the step (a) includes the step of carrying out a service in which no disconnection can be made by the origination WLL terminal until a destination WLL subscriber terminal required by a provided digit disconnects if at least one particular digit is provided.

Preferably, the step (a) includes the step of carrying out a service in which a service of connection to a destination WLL terminal is made after requiring a password for connection to the destination WLL terminal required by a provided digit if at least one particular digit is provided.

Preferably, the step (a) includes the step of carrying out a service in which a service of restricting the particular destination WLL subscriber terminal, or restricting a particular area the destination WLL terminal is located required by a provided digit is made if at least one particular digit is provided.

Preferably, the step (a) includes the step of carrying out a facsimile service to a destination WLL terminal required by a provided digit if at least one particular digit is provided.

To achieve at least the above objects in whole or in parts, there is further provided a method for making communication in a wireless local loop system having a base station and WLL terminals each with a wireless access device for wireless access to the base station, including (a) the wireless access device analyzing at least one digit from an origination WLL terminal and carrying out a service required by the digit, when the WLL terminal is off-hooked, (b) in a case of not being provided with any digit for a preset period after a last digit is provided among the digit, the wireless access device transmits one of the digit and information corresponding to the digit information to the base station, and (c) connecting the origination WLL terminal and a destination WLL terminal according to the transmission, to carry out communication.

To achieve at least the above objects in whole or in parts, there is further provided a method for making communication in a wireless local loop system having a base station and WLL terminals each with a wireless access device for wireless access to the base station, including (a) the switching center transmitting a message to the wireless access device, the message preventing a dial tone from the switching center from being provided to the subscriber, (b) the wireless access device putting its vocoder inoperative according to the message, and analyzing at least one digit from an origination WLL terminal and carrying out a service required by the digit, after the origination WLL terminal is off-hooked, (c) in a case of not being provided with any digit for a preset period after a last digit is provided among the digit, the wireless access device transmits one of the digit and information corresponding to the digit information to the base station, and (d) connecting the origination WLL terminal and a destination WLL terminal according to the transmission, to carry out communication.

To achieve at least the above objects in whole or in parts, there is further provided a wireless communication system, including a communication terminal configured to receive user input commands, a wireless access device, coupled to the communication terminal and configured to receive the user input data from the communication terminal, and a base station, configured to wirelessly connect the wireless access device to a communication system, wherein the wireless access device is configured to establish a communication channel with the base station upon detecting an off-hook state of the communication terminal, wherein the wireless access device is configured to store at least one user input command from the communication terminal and further configured to transmit one of the at least one stored user input command and information corresponding to the at least one stored user input command to the base station after a final user input command is provided, so as to establish a call with a destination terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
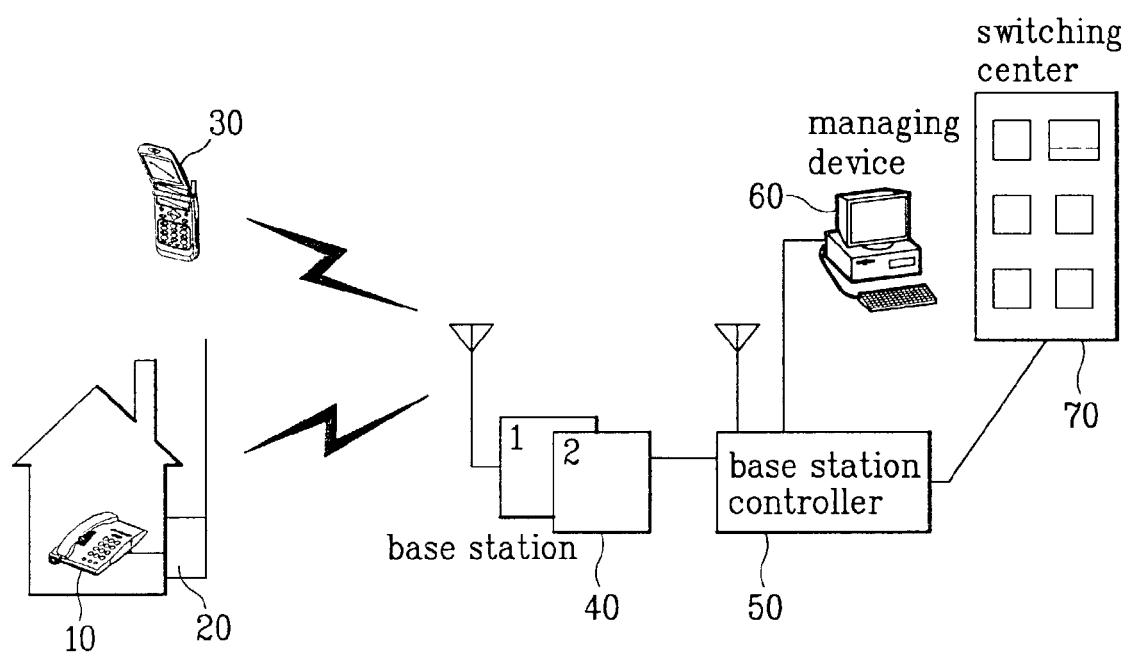
FIG. 1 illustrates related art separate type and integrated type WLL system.

Reference will now be made to the preferred embodiments of the present invention, examples of which are illustrated in the accompanying drawings. Because the structure of the WLL system having the present invention applied thereto is similar to the related art WLL system in FIG. 1, explanation of the WLL system will be omitted.

Figure 2:
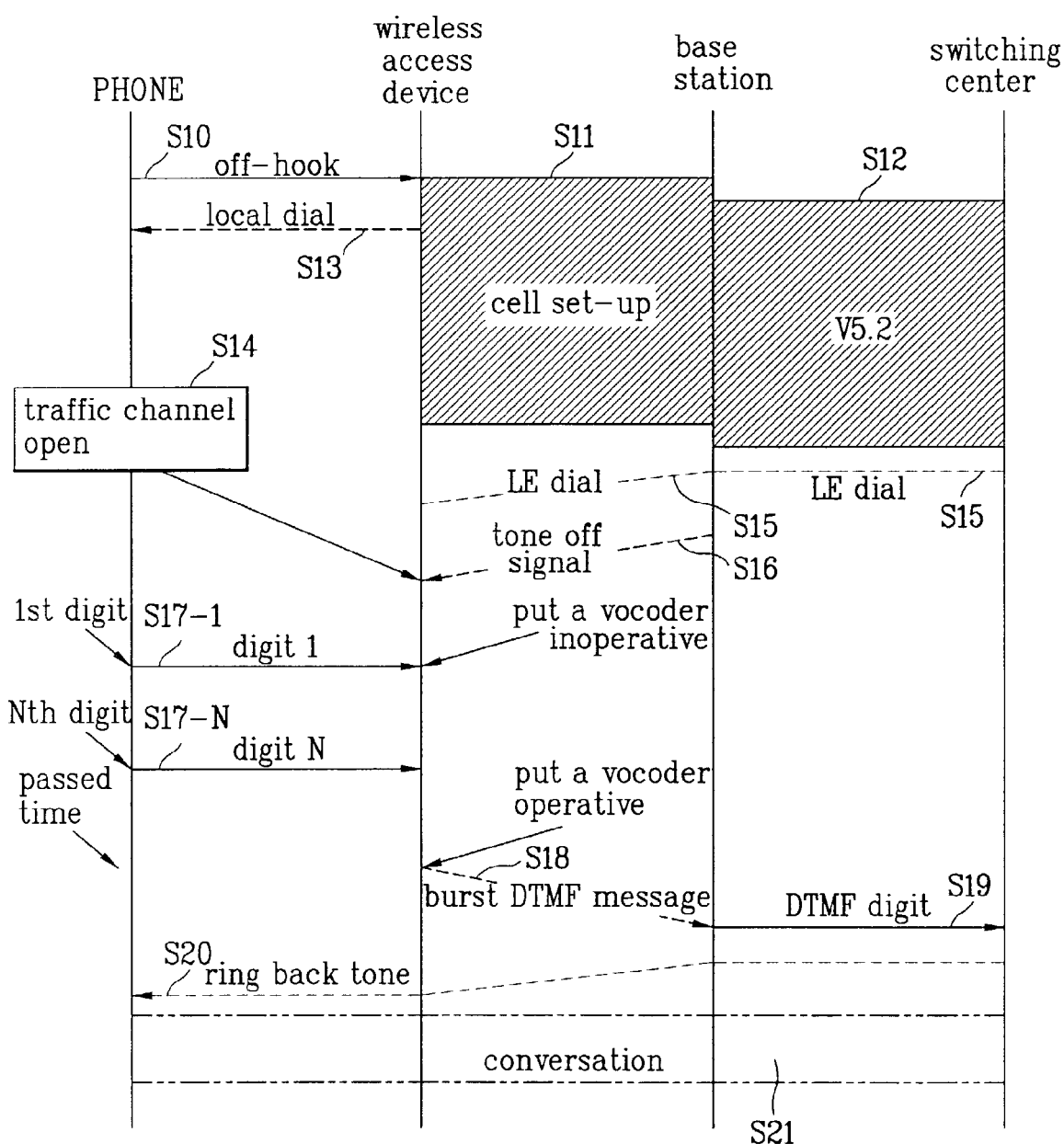
FIG. 2 illustrates a procedure for establishing a communication path in a WLL system in accordance with a preferred embodiment of the present invention.

FIG. 2 illustrates a procedure for establishing a communication path in the WLL system in accordance with a preferred embodiment of the present invention. Referring to FIG. 2, when the originating WLL terminal 10 or 30 is taken off-hook (S10), an origination message, including origination terminal information of the WLL terminal 10 or 30, is transmitted to the base station 40 through the wireless access device in the WLL terminal 30 or the wireless access device 20 connected to the stationary telephone set 10 (S10).

In this instance, the WLL terminal 10 or 30 preferably attempts to obtain a communication channel (or a traffic channel) from the base station 40 by transmitting the origination message. The origination message includes no digit information provided from an origination terminal subscriber 10 or 30.

A call is thus set up between the WLL terminal 10 or 30 and the base station 40 (S11). After the call is set up, the base station 40 and the switching center 70 exchange messages, preferably using V5.2 signaling protocol (S12). The wireless access device 20 or 30 also preferably provides a local dial tone indicating that the origination terminal information has been transmitted to the WLL terminal 10 or 30 (S13).

After the call is set up, a Local Exchange (LE) dial tone is continuously provided from the switching center 70 to the wireless access device 20 or 30 (S15). The switching center 70 preferably provides a preset signal for cutting off the LE dial tone to the wireless access device 20 or 30 to prevent the LE dial tone from being provided to a subscriber of the WLL terminal 10 or 30 (S16).

In response to the tone cut off signal message, the wireless access device 20 or 30 preferably leaves its vocoder inoperative. The subscriber cannot hear the LE dial tone until the subscriber of the WLL terminal 10 or 30 provides a last digit, and a prescribed time period is passed. That is, the subscriber cannot hear the LE dial tone until the wireless access device 20 or 30 provides a burst DTMF message, including at least one of the digits or information corresponding to the digits, to the base station 40. The WLL terminal 10 or 30 has the call set up therefor, and the traffic channel assigned thereto (S14).

The process will next be described in additional detail. After the WLL terminal 10 or 30 is put into an off-hook condition (S10), the digits provided by the subscriber of the WLL terminal 10 or 30 are temporarily stored in a buffer in the wireless access device 20 or 30 until a prescribed time period is passed after a last digit is provided.

At an end of the prescribed time period, the wireless access device 20 or 30 puts the vocoder back into operation, and at least one of the digits and the information corresponding to the digits stored in the buffer (not shown) is transmitted to the base station 40 through the burst DTMF message (S18). The information corresponding to the digits preferably includes service information of the digits.

Prior to transmission, the WLL terminal 10 or 30 preferably analyzes the digits temporarily stored in the buffer. Then, the WLL terminal 10 or 30 provides at least one of the digits and information corresponding to the digits loaded on the DTMF message to the base station 40 through the wireless access device 20 or 30 for supporting services required from the subscriber according to a result of the analysis.

The base station 40 provides a destination number (DTMF digits) to the switching center 70 based on the burst DTMF message, and the switching center 70 connects a call to a destination terminal of the destination number (S19).

Upon receiving the destination number, the switching center 70 preferably informs the destination terminal of the connection by providing a ring back tone to the WLL terminal 10 or 30 (S20). A communication between the WLL terminal 10 or 30 and the destination terminal can then be performed (S21).

The foregoing embodiment of the present invention can be summarized as follows. If the origination WLL terminal 10 or 30 is off-hook in an overlap type dialing, the origination message is provided to the base station 40, to establish a call between the base station 40 and the WLL terminal 10 or 30. Then, the wireless access device 20 or 30 temporarily stores at least one of the digits and digit information corresponding to the digits to the base station 40 in a buffer. The wireless access device 20 or 30 provides the one of the digits and information corresponding to the digits stored temporarily in the buffer to the base station 40 if a prescribed time period is passed after the subscriber provides a last digit, such as an enblock type dialing. The digit information corresponding to the digits could include a sequence of DTMF digit information that is stored in memory and recalled, or it could include a series of dialed digits.

That is, the WLL terminal 10 or 30 can process the temporarily stored digits until one of the stored digits and information corresponding to the digits are transmitted after a certain time period has passed from a time the last digit is provided after the WLL terminal 10 or 30 is taken off-hook.

Accordingly, the preferred embodiment facilitates the use of one of a speed dial function, an emergency call function, and an outgoing call lock function, which are enblock dial functions of the WLL terminal 10 or 30, during an overlap dialing in the WLL system. Other dial functions could also be supported. The WLL terminal 10 or 30 can preferably implement functions that require an origination number processing, such as a restrict call function and a prefix dial function.

The speed dial function, an abbreviated dialing function, is a function for transmitting required digits of a dial number by pressing a particular digit. The emergency call function, an emergency dialing function, is a function in which the origination terminal cannot disconnect a call until a destination terminal disconnects the call when the WLL terminal 10 or 30 calls a number registered for an emergency call mode. The outgoing call lock function is a function in which a dialing from the WLL terminal 10 or 30 can be made only when a particular password, given to the WLL terminal 10 or 30 in advance by the subscriber, is applied to the WLL terminal 10 or 30. The call restrict function is a function in which the subscriber can restrict particular dialing numbers or areas. The prefix dialing function is a function in which the subscriber can perform a facsimile mode dialing for dialing numbers starting with particular numbers.

In the enblock dial function, an origination message is transmitted by an automatic dialing timer after the subscriber provides a whole telephone number. After the origination message, which preferably includes the provided digits and dialing terminal information, is provided to the base station, the traffic channel is obtained. A system of the foregoing WLL terminal is illustrated in FIG. 3.

Figure 3:
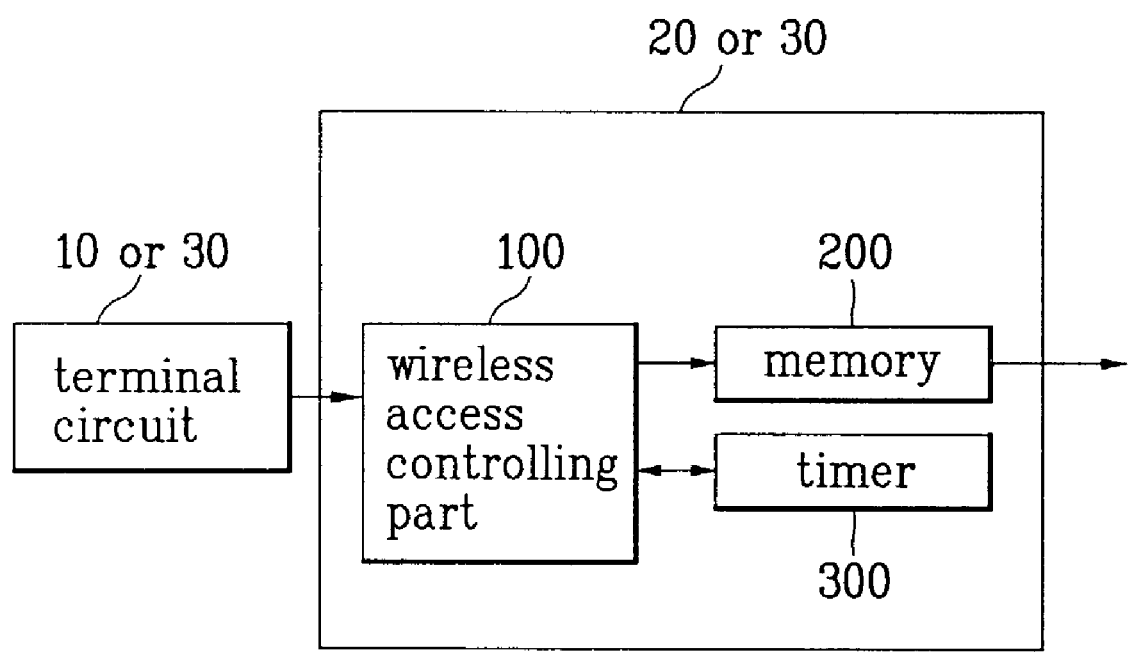
FIG. 3 illustrates a block diagram of a WLL terminal in accordance with a preferred embodiment of the present invention.

Referring to FIG. 3, the WLL terminal of the preferred embodiment includes a terminal circuit 10 or 30 for processing received data and data to be transmitted. A wireless access device 20 or 30 is also provided for wireless transmission/reception of the processed data to/from the base station 40.

The wireless access device 20 or 30 preferably includes a timer 300, a memory 200 for temporary storage of the digits provided by the subscriber, and a wireless access controlling part 100. The wireless access controlling part controls the timer 300 and controls transmission of the digits stored in the memory 200 as the timer 300 ends. Thus, the preferred embodiment is an application of the enblock dial function.

As has been explained, the method for making communication in a wireless local loop system of the present invention can reduce a load on a base station by using the terminal to analyze digits provided by a subscriber to selectively support services set by the subscriber. Accordingly, an overload condition of the base station can be prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for performing communication in a communication system, comprising:

storing at least one digit provided by a user and performing a service corresponding to the at least one stored digit, when an origination terminal is in an off-hook condition;

transmitting one of the at least one stored digit and information corresponding to the stored digit to a base station after a prescribed time period has passed from a time a last digit is provided; and putting a vocoder of a wireless access device that stores the at least one digit to be in an inoperative state when storing the at least one digit to prevent a dial tone from the base station from being provided to the origination terminal.

2. The method of claim 1, wherein the origination terminal comprises a wireless local loop (WLL) terminal having one of an external wireless access device and an internal wireless access device.

3. The method of claim 1, further comprising establishing a call between the origination terminal and the base station when the origination terminal is placed in the off-hook condition.

4. The method of claim 1, further comprising connecting the origination terminal to a prescribed destination subscriber terminal when a prescribed digit is provided as the at least one digit.

5. The method of claim 4, wherein the prescribed digit is associated with a number of the prescribed destination subscriber terminal.

6. The method of claim 5, wherein the user programs the origination mobile terminal to associate the prescribed digit with the number of the prescribed terminal.

7. The method of claim 1, further comprising preventing a disconnection by the origination terminal until a destination terminal disconnects, if at least one prescribed digit is provided.

8. The method of claim 7, wherein the prescribed digit corresponds to an emergency service terminal number.

9. The method of claim 1, further comprising requiring a password to be entered at the origination terminal before a connection to a destination terminal is made if the at least one digit is a prescribed digit.

10. The method of claim 1, further comprising restricting a connection to at least one of a prescribed destination terminal and a prescribed geographic location of a destination terminal if the at least one digit is a prescribed digit.

11. The method of claim 1, further comprising carrying out a facsimile service to a destination terminal required by a provided digit if at least one prescribed digit is provided.

12. A method for performing communication in a wireless local loop (WLL) system having a base station and at least one WLL terminal having a wireless access device for wireless access to the base station, the method comprising:
   analyzing by the wireless access device at least one digit provided from an origination WLL terminal and carrying out a service corresponding to the digit when the WLL origination terminal is in an off-hook state;
   transmitting one of the at least one digit and information corresponding to the at least one digit from the wireless access device to the base station if no further digit is provided within a prescribed period of time after a previous digit is provided among the at least one digit;
   putting a vocoder of the origination WLL terminal that stores that at least one digit to be in an inoperative state when storing the at least one digit to prevent a local exchange dial tone from the base station from being provided to the origination WLL terminal; and
   connecting the origination WLL terminal and a destination terminal according to the transmission to the base station, to carry out communication.

13. The method of claim 12, wherein the wireless access device is integrated with the WLL terminal.

14. The method of claim 12, wherein the wireless access device is external to the WLL terminal.

15. The method of claim 12, wherein the at least on digit is provided by a user to the origination WLL.

16. The method of claim 12, wherein the at least one digit is provided using a keypad as an input device.

17. The method of claim 12, further comprising storing the at least one provided digit at the wireless access device when the origination WLL terminal is in the off-hook state.

18. The method of claim 17, wherein the at least one provided digit is temporarily stored until the origination WLL is connected to the destination terminal.

19. The method of claim 12, further comprising carrying out a service of connecting to a prescribed destination terminal corresponding to the at least one provided digit if at least one prescribed digit is provided.

20. The method of claim 19, wherein the prescribed digit is associated with a number of the prescribed destination subscriber terminal.

21. The method of claim 12, further comprising preventing a disconnection by the origination WLL terminal until the destination terminal disconnects if at least one prescribed digit is provided.

22. The method of claim 21, wherein the prescribed digit corresponds to an emergency service terminal number.

23. The method of claim 12, further comprising requiring a password to be entered at the originating WLL terminal before the connection to the destination terminal is made if at least one prescribed digit is provided.

24. The method of claim 12, further comprising restricting a connection from the origination WLL terminal to at least one of a prescribed destination subscriber terminal and a prescribed geographic area if at least one prescribed digit is provided.

25. The method of claim 12, further comprising performing a facsimile service to a destination terminal if at least one prescribed digit is provided.

26. The method of claim 12, further comprising establishing a call between the origination WLL terminal and the base station after the origination WLL terminal placed into the off-hook state.

27. A method for performing communication in a wireless local loop (WLL) system having a base station and at least one WLL terminal having a wireless access device for wireless access to the base station, the method comprising:
   transmitting a message from a switching center of the WLL system to a wireless access device of an originating WLL terminal, the message preventing a dial tone from the switching center from being provided to the originating WLL terminal;
   putting a vocoder of the wireless access device in an inoperative state according to the message from the switching center, analyzing at least one digit inputted to the origination WLL terminal, and carrying out a service required by the at least one digit, after the WLL origination terminal is put into an off-hook state;
   transmitting any one of the at least one digit and information corresponding to the at least one digit information from the wireless access device to the base station if it is determined that no further digit is provided after a previous digit is provided among the at least one digit; and
   connecting the origination WLL terminal and a destination terminal according to the transmission from the wireless access device, to carry out communication.

28. The method of claim 27, wherein it is determined that no further digit is provided after the previous digit if a prescribed period of time passes after the previous digit is provided and no further digit is provided.

29. The method of claim 27, further comprising establishing a call between the origination WLL terminal and the base station after the origination WLL terminal placed into the off-hook state.

30. The method of claim 27, wherein the at least on digit is provided by a user to the origination WLL.

31. A wireless communication system, comprising:
   a communication terminal configured to receive user input commands;
   a wireless access device, coupled to the communication terminal and configured to receive the user input data from the communication terminal; and
   a base station, configured to wirelessly connect the wireless access device to a communication system, wherein the wireless access device is configured to establish a communication channel with the base station upon detecting an off-hook state of the communication terminal, wherein the wireless access device is configured to store at least one user input command from the communication terminal and further configured to transmit one of the at least one stored user input command and information corresponding to the at least one stored user input command to the base station after a final user input command is provided, so as to establish a call with a destination terminal, wherein the wireless access device comprises a VOCODER, the VOCODER being configured to become inoperative when the at least one user input command is being received by the communication terminal so as to prevent a dial tone from the base station from being provided to the wireless access device.

32. The device of claim 31, wherein the wireless access device is further configured to analyze the at least one user input command from the communication terminal and carry out a service corresponding to the at least one user input command.

33. The device of claim 31, wherein the at least one user input command comprises a digit dialed on a keypad of the communication terminal.

34. The device of claim 31, wherein the wireless access device is integrated with the communication terminal.

35. The device of claim 31, wherein the wireless access device is external to the communication terminal.

36. The device of claim 31, wherein the communication terminal comprises a wireless local loop (WLL) terminal.

37. The device of claim 31, wherein the wireless access device comprises:

a timer to determine when the prescribed time period has passed from the time the final user input command is provided;

a memory to store the at least one user input command; and a wireless access controller to control the timer and the transmission of the user input command stored in the memory when the timer determines that the prescribed time period has passed.

38. The device of claim 31, wherein a message is transmitted from the communication system to the wireless access device to prevent a dial tone from the communication system from being provided to the communication terminal.

39. The device of claim 31, wherein the VOCODER becomes reactivated when the prescribed time period has passed from the time the final user input command is provided, and wherein a burst DTMF message is sent from the wireless access device to the base station when the VOCODER becomes reactivated.

40. The device of claim 31, wherein it is determined that a final input command is provided when no further input command is provided after a previous input command if a prescribed period of time passes after the previous input command is provided.

41. The device of claim 31, wherein the communication terminal is configured to connect to a prescribed destination subscriber terminal when a prescribed digit is provided as the input command.

42. The device of claim 41, wherein the prescribed digit is associated with a number of the prescribed destination subscriber terminal.

43. The device of claim 42, wherein a user of the communication terminal programs the communication terminal to associate the prescribed digit with the number of the prescribed destination subscriber terminal.

* * * * *